(12) United States Patent
Doppler et al.

(10) Patent No.: US 10,406,051 B2
(45) Date of Patent: Sep. 10, 2019

(54) TRANSMISSION FOR AN ADJUSTABLE-HEIGHT PLATFORM AND METHOD FOR CHANGING A HEIGHT OF A PLATFORM

(71) Applicant: AKTIEBOLAGET SKF, Gothenburg (SE)

(72) Inventors: Manuel Doppler, Wehr (DE); Klaus Pfeffer, Schopfheim (DE); Marcel Soltermann, Sankt Pantaleon (CH); Tobias Tschabold, Pratteln (CH)

(73) Assignee: Aktiebolaget SKF, Gothenburg (SE)

( * ) Notice: Subject to any disclaimer, the term of this patent is extended or adjusted under 35 U.S.C. 154(b) by 517 days.

(21) Appl. No.: 14/723,766

(22) Filed: May 28, 2015

(65) Prior Publication Data

US 2015/0342809 A1    Dec. 3, 2015

(30) Foreign Application Priority Data

May 28, 2014 (DE) .......... 10 2014 210 253

(51) Int. Cl.
| | |
|---|---|
| *F16H 1/22* | (2006.01) |
| *A61G 7/012* | (2006.01) |
| *F16H 55/06* | (2006.01) |
| *F16H 25/20* | (2006.01) |
| *A61G 13/06* | (2006.01) |

(52) U.S. Cl.
CPC ............ *A61G 7/012* (2013.01); *A61G 13/06* (2013.01); *F16H 1/22* (2013.01); *F16H 25/20* (2013.01); *F16H 55/06* (2013.01); *F16H 2025/209* (2013.01); *F16H 2025/2046* (2013.01); *F16H 2025/2053* (2013.01); *F16H 2025/2059* (2013.01); *F16H 2025/2084* (2013.01); *Y10T 74/18616* (2015.01)

(58) Field of Classification Search
CPC ................................................ F16H 2025/2053
See application file for complete search history.

(56) References Cited

U.S. PATENT DOCUMENTS

| | | | |
|---|---|---|---|
| 1,009,186 A | 11/1911 | Sargent | |
| 1,018,127 A | 2/1912 | Olson | |
| 1,096,316 A | 5/1914 | Noble | |
| 1,176,751 A | 3/1916 | Hardy et al. | |
| 1,748,948 A * | 3/1930 | Gassen | F16H 25/20 414/198 |
| 2,522,759 A | 9/1950 | Lindquist | |
| 2,870,460 A | 1/1959 | Sanford | |

(Continued)

FOREIGN PATENT DOCUMENTS

| | | |
|---|---|---|
| CN | 2412709 Y | 1/2001 |
| CN | 2770625 Y | 4/2006 |

(Continued)

*Primary Examiner* — William Kelleher
*Assistant Examiner* — Gregory T Prather
(74) *Attorney, Agent, or Firm* — Laurence A. Greenberg; Werner H. Stemer; Ralph E. Locher

(57) ABSTRACT

A transmission for an adjustable-height platform includes at least one drive shaft, at least one output shaft, at least one first gear wheel configured to transmit a rotational movement of the drive shaft to the output shaft, and at least one second gear wheel configured to drive a hollow second output shaft. The at least one first gear wheel is formed from or includes at least portions formed from plastic.

18 Claims, 11 Drawing Sheets

(56) References Cited

U.S. PATENT DOCUMENTS

| | | | |
|---|---|---|---|
| 4,405,116 A | 9/1983 | Eisenberg | |
| 5,269,031 A | 12/1993 | Alexander | |
| 5,337,627 A | 8/1994 | Nakamura | |
| 5,803,437 A * | 9/1998 | Paterson | B66D 1/14 254/276 |
| 6,000,076 A | 12/1999 | Webster et al. | |
| 2004/0171453 A1* | 9/2004 | Bock | B62D 5/008 475/228 |
| 2007/0295126 A1* | 12/2007 | Wang | F16H 25/20 74/89.35 |
| 2011/0067946 A1* | 3/2011 | Kim | B62D 5/0409 180/444 |
| 2012/0084921 A1 | 4/2012 | Serhan | |
| 2013/0008276 A1* | 1/2013 | Horikawa | F16H 55/088 74/427 |
| 2014/0311267 A1* | 10/2014 | Figura | F16H 55/24 74/425 |

FOREIGN PATENT DOCUMENTS

| | | |
|---|---|---|
| CN | 201047429 Y | 4/2008 |
| CN | 101595029 A | 12/2009 |
| CN | 201525138 U | 7/2010 |
| CN | 101922520 A | 12/2010 |
| CN | 102057183 A | 5/2011 |
| CN | 103126841 A | 6/2013 |
| DE | 1168014 B | 4/1964 |
| DE | 1182408 B | 11/1964 |
| DE | 2626638 A1 | 12/1977 |
| DE | 20115608 U1 | 2/2003 |
| DE | 69727882 T2 | 7/2004 |
| DE | 102004016728 A1 | 10/2005 |
| DE | 202006008307 U1 | 8/2006 |
| DE | 102005016183 A1 | 10/2006 |
| DE | 202013104814 U1 | 11/2013 |
| EP | 1710470 A2 | 10/2006 |
| JP | S62283250 A | 12/1987 |

* cited by examiner

TRANSMISSION FOR AN ADJUSTABLE-HEIGHT PLATFORM AND METHOD FOR CHANGING A HEIGHT OF A PLATFORM

CROSS-REFERENCE

This application claims priority to German patent application no. 10 2014 210 253.7 filed on May 28, 2014, the contents of which are fully incorporated herein by reference.

TECHNOLOGICAL FIELD

Exemplary embodiments are directed to a transmission for an adjustable-height platform such as a patient-examination table, and to a method for changing the height of such a platform.

BACKGROUND

Adjustable-height platforms are used in a variety of different applications. For example, a platform can be loaded with an item or person at a first height, raised or lowered to a second height so that the item or a person can be treated, inspected, and/or examined and then lowered or raised to a third height, which may be the same as the first height, so that the item or patient can be removed. Such platforms can be used in medical applications, for example, as couches, tables, examination tables, or the like. Due to the height-adjustability of the platform, a patient, for example, can be brought to a height at which the patient can be treated, relocated to another platform or table and/or leave the platform again. A variety of adjusting devices can be used to adjust the height of the platform.

In addition to the need for precise and exact height adjustments, such adjustable-height platforms (and methods for adjusting them) are subject to a variety of further requirements, for example, the need to keep vibration levels and noise low and to be highly reliable.

SUMMARY

Exemplary embodiments of the present disclosure relate to a transmission for an adjustable-height platform, an examination table, for example, which transmission includes at least one drive shaft and at least one output shaft. The transmission further comprises at least one gear wheel configured to transmit a rotational movement of the drive shaft to the output shaft, and the gear wheel is made from or coated with or comprises a plastic material.

According to a further aspect, exemplary embodiments comprise a method for changing a height of a platform such as an examination table. In the method a drive shaft is driven, and a rotational movement of the drive shaft is transmitted to the gear wheel. The gear wheel is made from or coated with or comprises a plastic material. The rotational movement is transmitted from the gear wheel to the output shaft.

Since the gear wheel comprises plastic, in some exemplary embodiments vibration can be reduced or even completely avoided when operating the transmission, and noise levels can also be reduced.

As used herein, a drive shaft can be, for example, a shaft that is driven by a drive, for example a drive motor and/or a manual drive. An output shaft can be, for example, a shaft that rotates about an axis that is disposed parallel to the direction in which the height is to be changed.

The gear wheel can be manufactured by milling. In some exemplary embodiments a surface of the gear wheel can thus be formed that is particularly low-noise or low-vibration in operation. Furthermore, in some exemplary embodiments a simple manufacturing of the gear wheel can thereby be made possible.

Additionally or alternatively, in some exemplary embodiments the drive shaft comprises a steel as material. For example, a particularly vibration-damping and/or low-noise material pairing can be provided by the combination of steel and plastic.

Additionally or alternatively, in some exemplary embodiments the gear wheel is a worm gear wheel. Furthermore the drive shaft can also have a worm gear in the region wherein it is in engagement with the worm gear wheel. In some exemplary embodiments a particular low-vibration and low-noise gear can thus be provided for a torque transmission.

In some exemplary embodiments the gear wheel is replaceable. As a result, since the gear wheel, which includes plastic, possibly comprises a less wear-resistant material than metal, it can under certain circumstances be replaced in a simple manner after a certain degree of wear. Other components of the transmission can optionally remain in use.

In some further exemplary embodiments the transmission comprises at least one second gear wheel that is configured to drive a second output shaft. The second output shaft is configured, for example, to enlarge a stroke of the height-adjustment device per revolution. In some exemplary embodiments a height-adjustment device can thus be manufactured having more stroke or a larger stroke but having the same installation dimensions. Additionally or alternatively, in some exemplary embodiments the output shaft is a hollow shaft, and the gear wheel is attached to the surface of the hollow shaft. In some exemplary embodiments the gear wheel can thus be replaced in a simple manner. For example, the gear wheel can be arranged to be concentric to the hollow shaft, and the two output shafts can be arranged to be parallel to each other and/or at a right angle to the drive shaft.

Additionally or alternatively, in some exemplary embodiments the transmission comprises a threaded rod having an external thread, which rod is at least partially received in the hollow shaft. This threaded rod also further comprises an adapter piece including an internal thread that is configured to be in engagement with the external thread of the threaded rod and/or to form raceways for balls with the external thread of the threaded rod. The adapter piece includes an adapter attachment structure that is configured to connect the adapter piece to a corresponding hollow-shaft attachment structure of the hollow shaft such that they rotate together. In some exemplary embodiments the need for applying or forming threads for the balls in the interior of the hollow shaft can thus be avoided, thereby simplifying the manufacture and/or replacement of the hollow shaft. Here the threads can be in engagement with one another, for example, via balls or rollers. The internal thread and/or a part of the raceway for the balls or rollers can also be directly introduced into the hollow shaft. Thus in some exemplary embodiments the adapter piece can be omitted.

Exemplary embodiments according to a further aspect also relate to a platform that is adjustable in height, for example an examination table, that includes a transmission according to at least one of the preceding exemplary embodiments. The platform also includes a platform plate whose position with respect to a surface on which the platform stands is adjustable. In some exemplary embodiments the platform or its platform plate can thus be adjustable in height in a particularly low-noise and/or low-vibration manner.

BRIEF DESCRIPTION OF THE DRAWINGS

The exemplary embodiments and their individual features disclosed in the above description, the following claims, and the accompanying Figures can be meaningful and implemented both individually and in any combination for the realization of an exemplary embodiment in its various designs.

FIGS. 1b and 1c are side views of the transmission of FIG. 1a.

FIG. 1d is a further side view of the transmission according to FIG. 1a.

FIG. 1e is a schematic cross-sectional view along the section line B-B of FIG. 1a.

FIG. 1f is a schematic cross-sectional view through the section line C-C of FIG. 1a.

FIG. 1g is a schematic cross-sectional view through the section line A-A FIG. 1a.

FIG. 3b is a view of the platform according to the exemplary embodiment of FIGS. 2 and 3a.

FIG. 4b is a schematic view of an enlarged detail of FIG. 4a.

FIG. 4c is a schematic perspective view of the threaded rod of FIG. 4a.

DETAILED DESCRIPTION

Figure 1C:
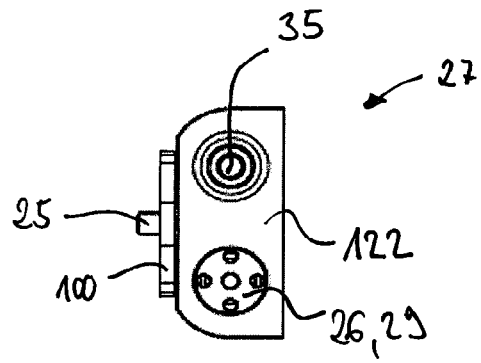
Figure 1B:
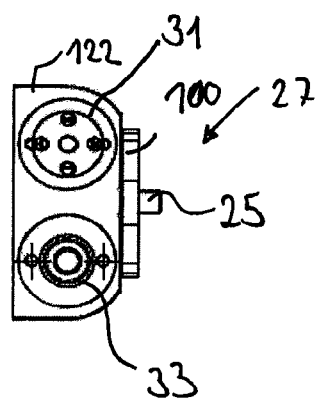
Figure 1A:
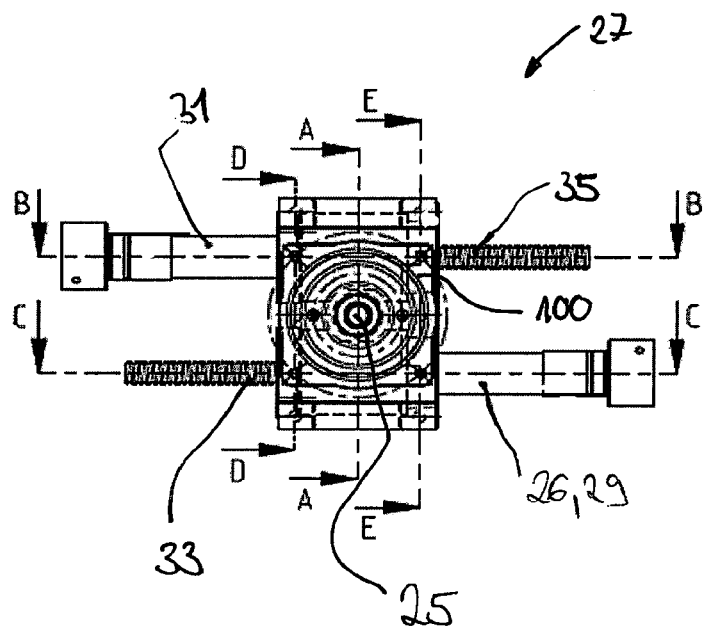
FIG. 1a is a schematic front view of a transmission for a height-adjustment device according to an exemplary embodiment.
Figure 1D:
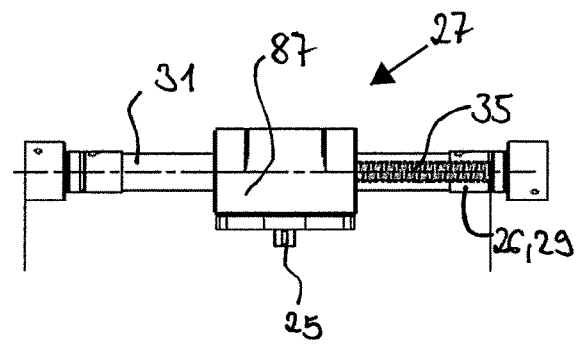

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

FIGS. 1a to 1j show different views and depictions of a transmission 27 for a height-adjustable platform. As can be seen, for example, in FIG. 1g, the transmission 27 comprises a drive shaft 25, at least one output shaft 26, and at least one gear wheel 28, which gear wheel 28 is configured to transmit a rotational movement of the drive shaft 25 to the output shaft 26. The gear wheel 28 comprises a plastic material; that is, the gear wheel 28 is formed partially or entirely from a plastic material or is partially or entirely coated with the plastic material.

The plastic can be, for example, a thermoplastic, for example, polyoxymethylene(POM). In some exemplary embodiments the gear wheel 28 can be manufactured entirely from the plastic. In other exemplary embodiments, for example, only a surface or even only functional surfaces of the gear wheel 28 can comprise the plastic or be coated therewith.

Conventional adjustment devices or transmissions for height-adjustable platforms, like examination tables, usually comprise a transmission to achieve a redirection of a force and/or force transmission. Parts of such transmissions are usually manufactured from metallic materials. Operating such a platform, for example, adjusting the height of the platform, may produce vibrations and noise. This is generally undesirable because the vibrations and/or noise can reduce the comfort of a patient who is lying on the platform and/or be disturbing to an operator or surgeon. However, these problems are reduced or avoided by changing the material of the at least one gear wheel to a material that absorbs vibrations. As a result, vibrations and/or vibration noises that would otherwise occur in the transmission can be reduced or eliminated. The at least one gear wheel 28, which can also be referred to as a transmission wheel, is thus manufactured from plastic or plastic materials, in order to reduce noises and vibrations.

Figure 5:
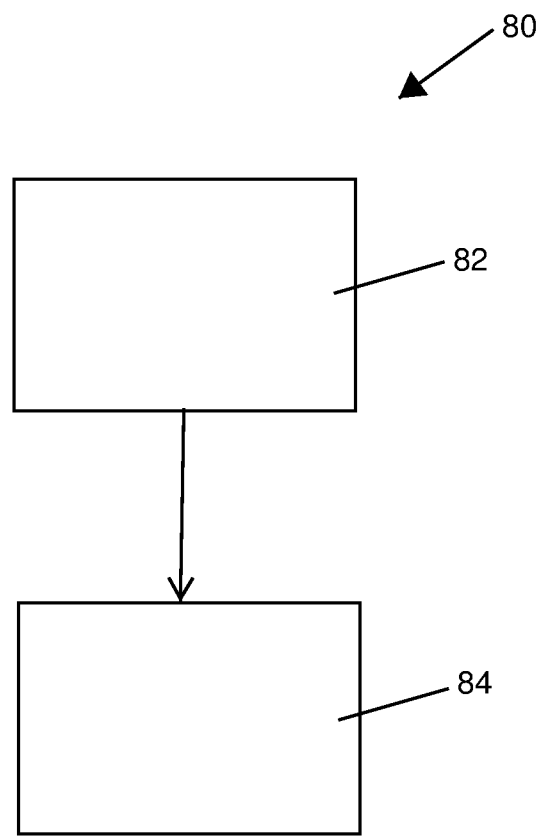
FIG. 5 is a schematic depiction of a method for changing a height of a platform according to an exemplary embodiment.

FIG. 5 illustrates a method 80 for changing a height of a platform using the transmission 27. In the method 80, in a process 82 a rotational movement is transmitted from the drive shaft 25 to the gear wheel 28, which includes a plastic material. From this gear wheel 28 the rotational movement is transmitted to the output shaft 26 in a process 84. In some further exemplary embodiments the method 80 can also be performed using other transmissions.

In the exemplary embodiment of FIGS. 1a to 1j, the output shaft 26 is a hollow shaft 29 of a ball screw. In some further, not-illustrated exemplary embodiments, the drive shaft can also belong to a linear motion unit of another type, such as, for example, a lead screw or a roller screw.

The transmission 27 comprises a second gear wheel 30, which, in an analogous manner to the gear wheel 28, transmits a torque from the drive shaft 25 to a further output shaft, namely a hollow shaft 31 that belongs to a further ball screw. As can be seen in FIG. 1, the drive shaft 25 is rotatably supported in a transmission housing 87 via a first rolling-element bearing 85, which can be configured, for example, as a ball bearing, and a second rolling-element bearing 86. In some further, not-depicted exemplary embodiments, the drive shaft can be supported in another manner. The rolling-element bearings can be configured as rolling-element bearings of different designs, ball bearings, roller bearings, tapered roller bearings, or the like.

The drive shaft 25 includes a worm gear 88 in a region at which the drive shaft 25 engages with the gear wheels 28 and 30. The worm gear 88 is located on one end of the drive shaft 25, and the worm gear 88 of the drive shaft 25 is formed from or comprises steel. The gear wheels 28 and 38 also include a corresponding worm gear. In some further, not-depicted exemplary embodiments the drive shaft and/or the gear wheels can include other gears which engage into one another.

Figure 1E:
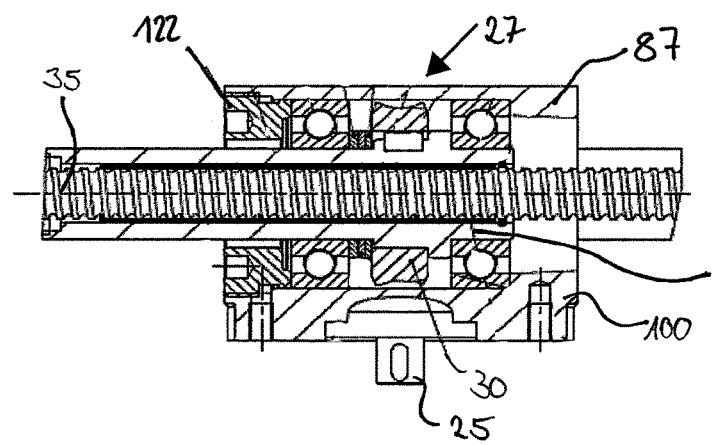
Figure 1F:
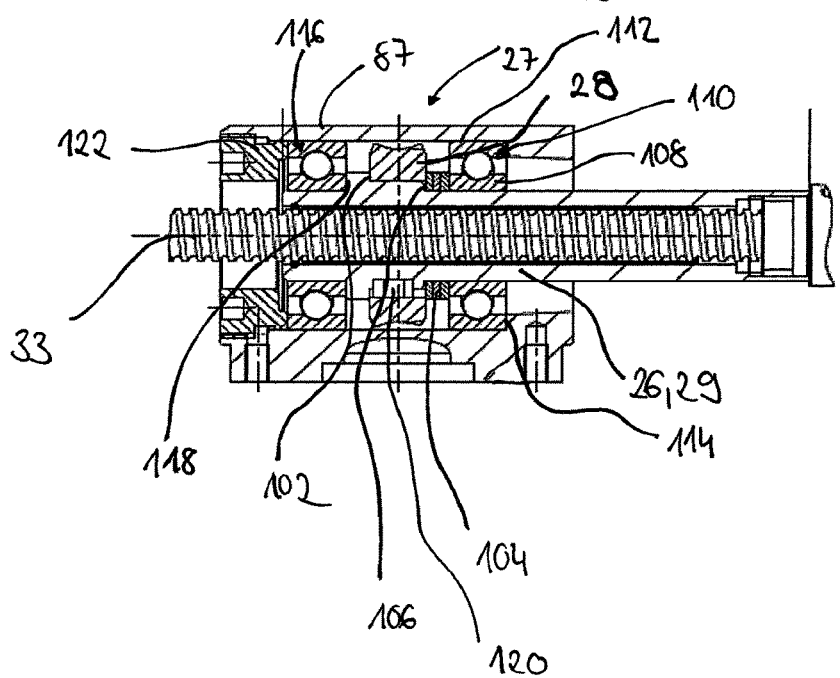
Figure 1G:
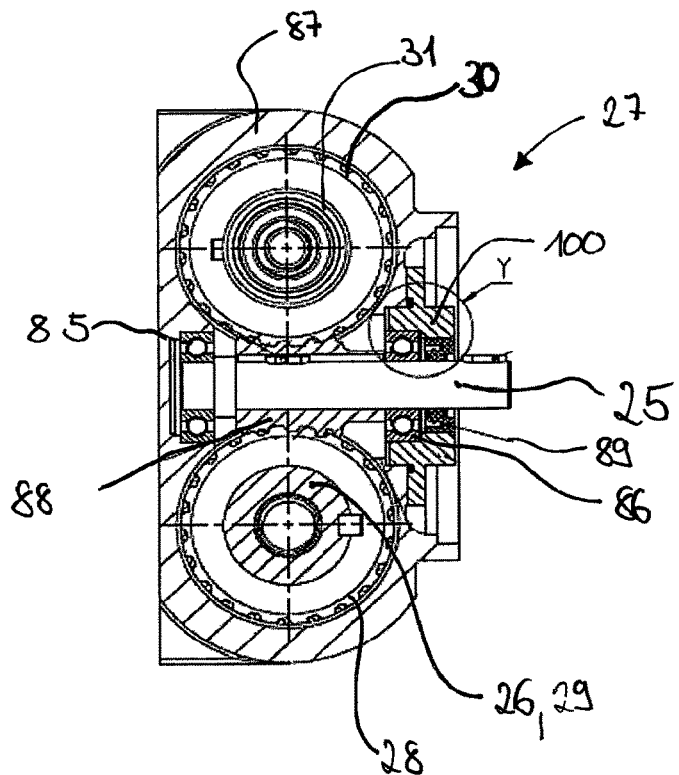
Figure 1H:
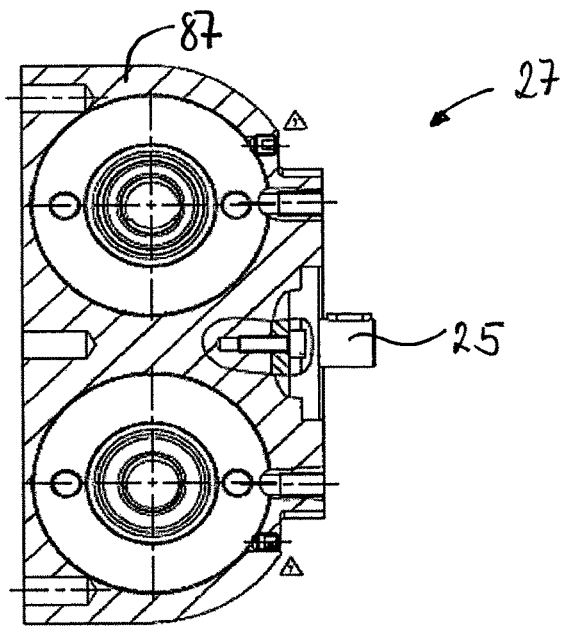
FIG. 1h is a schematic cross-sectional view through the transmission of FIG. 1a along the section line D-D.
Figure 1I:
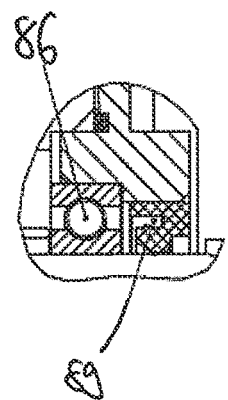
FIG. 1i is an enlarged detail of FIG. 1g.
Figure 1J:
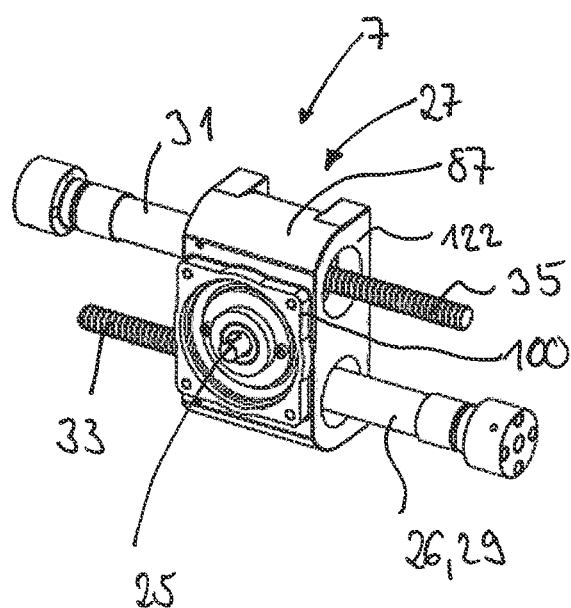
FIG. 1j is a perspective view of the transmission of FIGS. 1a to 1i.

In the direction of the drive shaft 25 the transmission housing 87 includes an opening, which is closed by a transmission cover 100 having a seal ring 89 therein. As can be seen in the enlargement of FIG. 1i, the seal ring 89 includes a seal edge that glides/grinds/drags on the drive shaft 25 or a surface of the drive shaft 25. In some further, not-depicted exemplary embodiments a rolling-element bearing having a seal, or another rolling-element bearing having a seal can be used instead of the rolling-element bearing 86. In some exemplary embodiments the seal can also be omitted.

The gear wheel 28 is supported in the axial direction between a stop 102 on an outer surface of the hollow shaft 29 and a plurality of spacer rings 104, and these spacer rings 104 are supported in the axial direction on a shoulder of the housing 87 via a bearing 110 or an inner ring 108 of the bearing 110. The spacer rings 104 have a greater radial-outward extension than the shoulder 106 and can thus fix the gear wheel 28 in the axial direction. The spacer rings 104 are fixed in the axial direction via a rolling-element bearing 110 and the housing 87. For this purpose the spacer rings 104 are supported against an inner ring 108 of the rolling-element bearing 110, via which bearing the hollow shaft 29 is rotatably supported relative to the housing 87. An outer ring 112 of the rolling-element bearing 110 is supported via an axial stop 114 of the housing 87. The hollow shaft 29 is also supported relative to the housing 87 via a second rolling-element bearing 116, and an inner ring of the second rolling-element bearing 116 is supported against an axial stop 118 on the hollow shaft. The two bearings 116 and 110 are disposed such that the gear wheel 28 is located axially between them. In the exemplary embodiment three spacer rings are disposed between the gear wheel 28 and the rolling-element bearing 110. In some further, not-depicted exemplary embodiments, a different number of spacer rings and/or a different bearing assembly can also be provided.

The gear wheel 28 is disposed on the hollow shaft 29, such that they rotate together, via a tongue-and-groove connection 120. The hollow shaft 29 and/or the gear wheel 28 has a groove for receiving a key. In some further, not-depicted exemplary embodiments, the gear wheel can be rotationally fixed to the hollow shaft 29 in a different manner.

The hollow shaft 31 is supported relative to the transmission housing 78 via rolling-element bearings in a substantially analogous manner. As can be seen in FIG. 1e, the gear wheel 30 is attached to the hollow shaft 31 in an analogous manner.

The transmission housing 87 is closed via a side part 122 in the axial direction of the hollow shafts 29 and 31. The side part 122 includes an opening through which a threaded rod 33 extends into the hollow shaft 29. The hollow shaft 29 and the threaded rod 33 are components of a ball screw. The threaded rod 33 is movably guided relative to the hollow shaft 29 via a plurality of balls which move in raceways formed between an internal thread of the hollow shaft 29 and an external thread of the threaded rod 33. The hollow shaft 29 further comprises threads (not illustrated) through which the balls can be guided back again. Rotating the hollow shaft 29 moves the threaded rod 33 into or out of the hollow shaft 33, depending on the direction of rotation of the hollow shaft 29. The hollow shaft 31 is also a component of a ball screw. This comprises a threaded rod 35 that is also movably guided in the hollow shaft 31.

Figure 2:
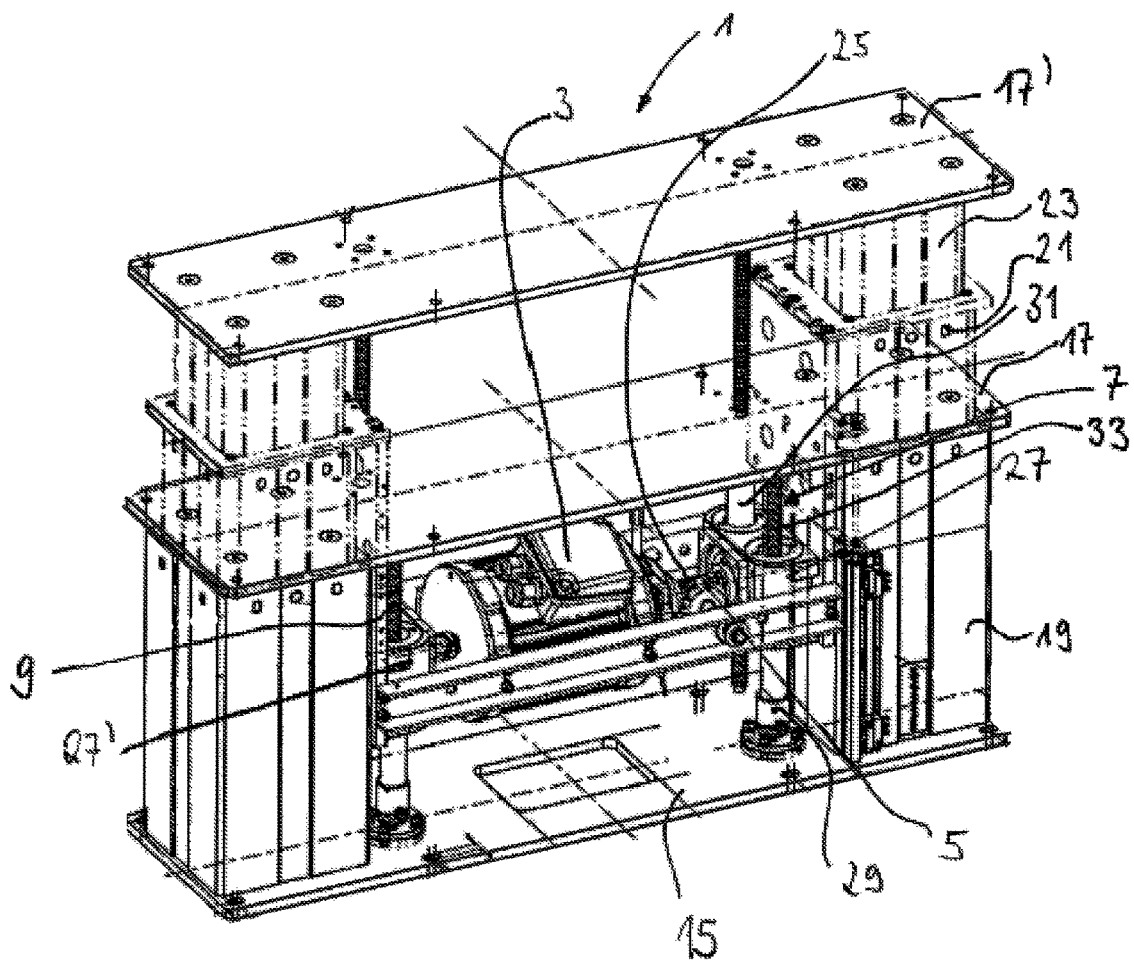
FIG. 2 is a schematic perspective view of an adjustable-height platform including a transmission according to an exemplary embodiment.
Figure 3A:
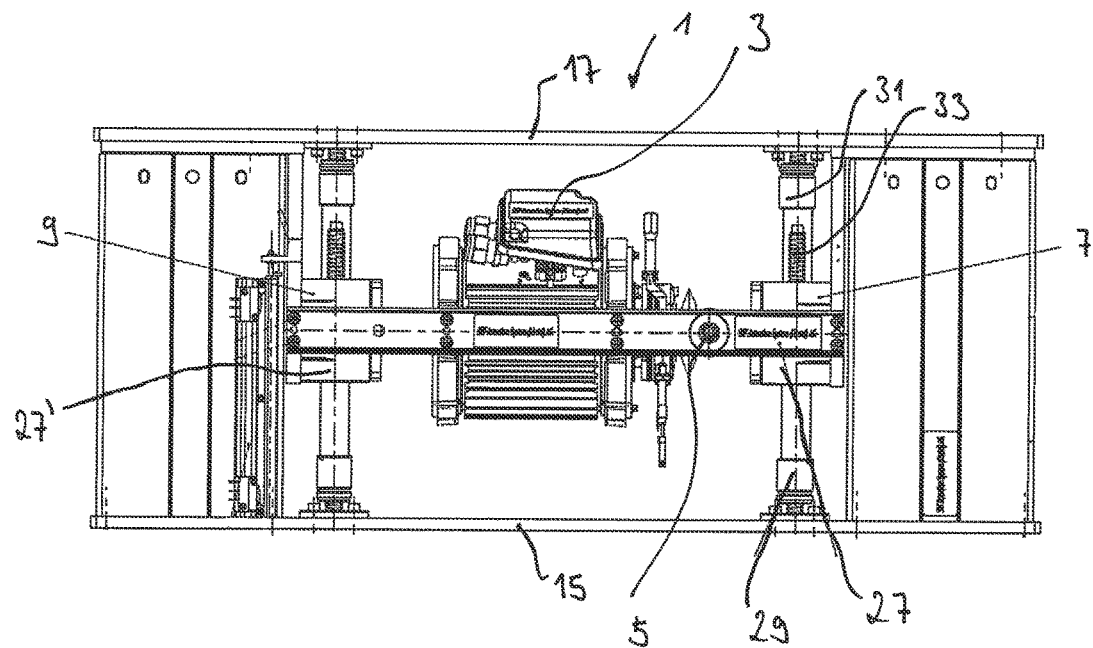
FIG. 3a is a front view of the platform including the transmission according to the exemplary embodiment of FIG. 2.
Figure 3B:
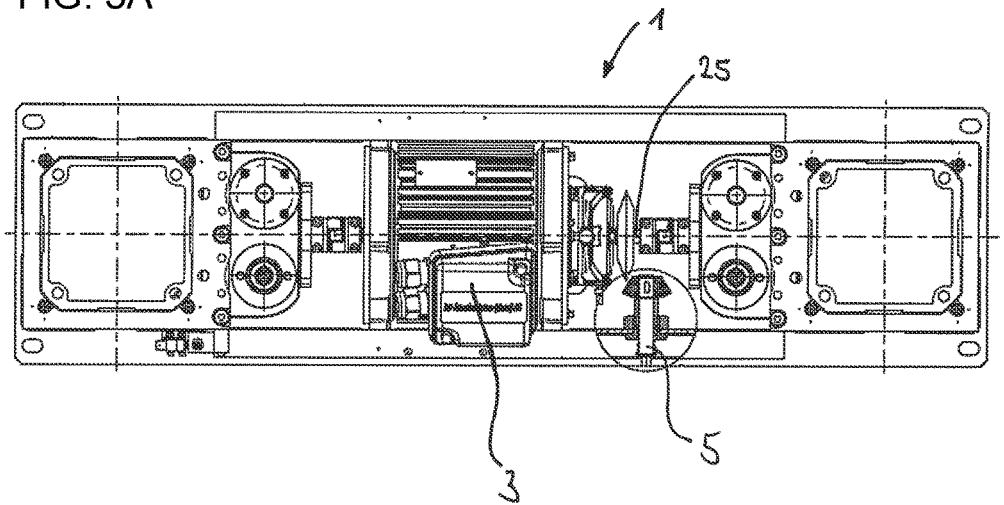

FIGS. 2, 3a, and 3b show different views of an adjusting device 1 for an adjustable-height platform, for example an examination table, including the transmission 27. The adjusting device 1 further comprises a drive motor 3 that is configured to change a height H of the adjusting device 1. Furthermore, the adjusting device 1 also comprises a manual drive 5 that is configured to change a height H of the adjusting device 1. Here a height H of the adjusting device 1 can be an extension of the adjusting device 1 perpendicular to a base or to a surface on which the adjusting device 1 stands.

The manual drive 5 and the drive motor 3 can be used to drive the drive shaft 25 so that the drive shaft 25 rotates about an axis of rotation R. The drive motor can be, for example, an alternating-current motor. The drive shaft 25 is disposed perpendicular to the height H in which the adjusting device can be adjusted. A height-adjusting device 7 can be driven or have its height changed via the drive shaft 25 and the transmission 27, which can also be referred to as the transmission box/gearbox. Here the rotational movement is redirected by 90°. The rotational speed can be maintained, and a multiplying or reducing can optionally be effected. In the exemplary embodiment of the Figures, the adjusting device 1 also comprises, in addition to the first height-adjusting device 7, a second height-adjusting device 9, which can be adjusted via a transmission 27' that is configured in a manner substantially analogous to the transmission 27. Each of the height-adjusting devices 7 and 9 is disposed on an opposite end of the drive shaft 25. The drive shaft 25 engages on the transmissions 27 and 27' in the manner described and adjusts the four ball screws. In some further, not-depicted exemplary embodiments the height-adjusting devices or the transmission can also comprise other linear drives or linear guides.

Furthermore, the adjusting device 1 also comprises a first guide structure 11 and a second guide structure 13. The two guide structures 11 and 13 are disposed in the direction of the axis of rotation R outside the two height-adjusting devices 7 and 9. Both the two guide structures 11 and 13 and the two height-adjusting devices 7 and 9 are connected, respectively, to a base plate 15 and a platform plate 17. The hollow shaft 29 is attached to the base plate 15, and the hollow shaft 31 is attached to the platform plate 17. In FIG. 1 the platform plate 17 in an extended state is indicated with the reference number 17' and depicted using dashed lines. The platform plate 17 serves, for example, for attaching or receiving a support surface for a patient or an object. The base plate 15 is disposed on a surface on which the adjusting device 1 stands. The platform plate 17 is disposed substantially parallel to the base plate 15. In the present exemplary embodiment the base plate 15 and the platform plate 17 have similar dimensions. In some further, not-depicted exemplary embodiments the base plate and the platform plate can also have different dimensions.

The guide structures 11 and 13 serve for guiding an adjusting movement by the height-adjusting devices 7 and 9 and for stabilizing, but include no drive elements themselves. The guide structures 11 and 13 are each similarly constructed, telescopically movable pillars. Therefore in the following only the guide structure 11 is described in more detail. The guide structure 11 comprises three tubes 19, 21, and 23, each of which has a rectangular cross-section. In some further, not-depicted exemplary embodiments the guide structure can also have a different number of tubes, for example, five. The tube 19 having the largest cross-section is connected to the base plate 15. The tube 21 having a medium cross section is movably disposed and guided in the direction of the height H in the tube 19 having the largest cross-section. A further tube 23 having a smallest cross-section is also movably disposed and guided in the direction of the height H in the tube 21. The tube 23 having the smallest cross-section is connected to the platform plate 17. Due to their cross-sectional shapes the tubes 19 to 23 cannot rotate relative to one another. The two guide structures 11 and 13 can also be referred to as two telescopic pillars, each including three cylindrical sections, which comprise aluminum as material. In some further, not-depicted exemplary embodiments the adjusting device can also comprise no guide structures, only one guide structure, or another type of guide structure, for example a different linear guiding unit.

Using the transmission 27, an adjusting device, for example, for medical tables or examination tables, can meet the need for low noise and vibration levels when they are raised and lowered.

Figure 4A:
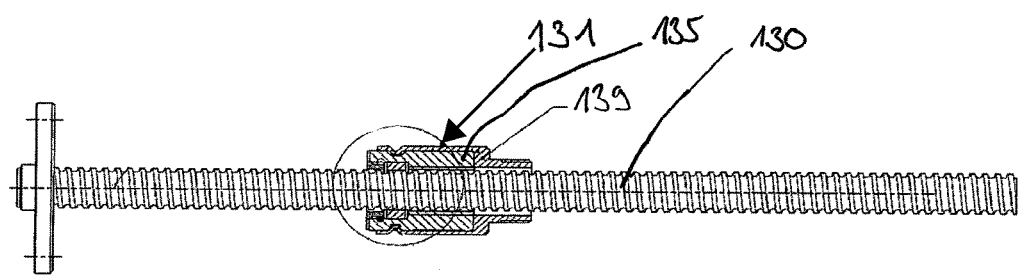
FIG. 4a is a schematic cross-sectional view of a threaded rod including an adapter piece for a transmission according to a further exemplary embodiment.
Figure 4B:
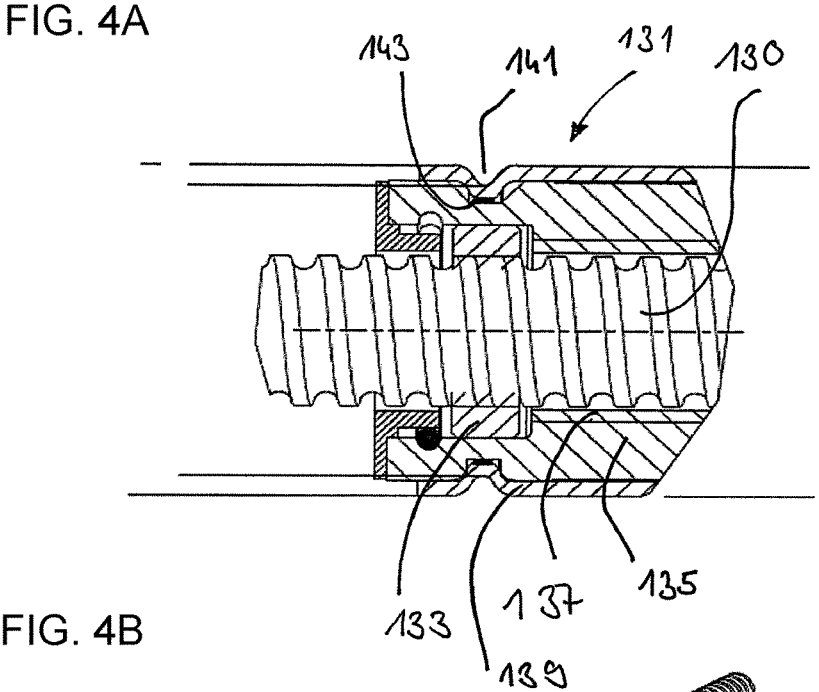
Figure 4C:
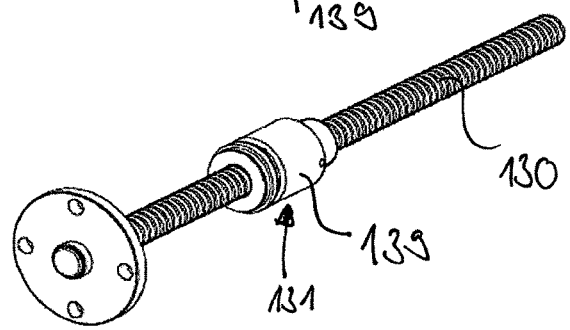

FIGS. 4a to 4c show a further exemplary embodiment of a threaded rod 130 for the transmission. The threaded rod 130 includes an adapter piece 131. As can be seen in the enlarged depiction of FIG. 4b, the adapter piece 131 comprises a nut 133 that is in engagement with an external thread of the threaded rod 130. The adapter piece 131 further comprises a sleeve 135 that includes schematically depicted threads 137. Together with the threads of the threaded rod 130 these threads form raceways for a plurality of not-depicted balls.

A casing 139 is disposed on an outer contour of the sleeve 135. The casing 139 has a greater axial extension than the sleeve 135, and includes a depression 141 at an axial height of the nut 133 that nestles in a groove 143 of the sleeve 135. The groove 143 encircles an outer surface of the sleeve 135 at the height of the nut 133. The depression 141 can be or comprise, for example, a thread, which serves as an adapter attachment structure. The adapter piece 131 can be attached in a hollow shaft using the adapter attachment structure. For this purpose the hollow shaft can also include a corresponding thread as hollow-shaft attachment structure. The adapter piece can also be integrated into the hollow shaft.

Figure 4D:
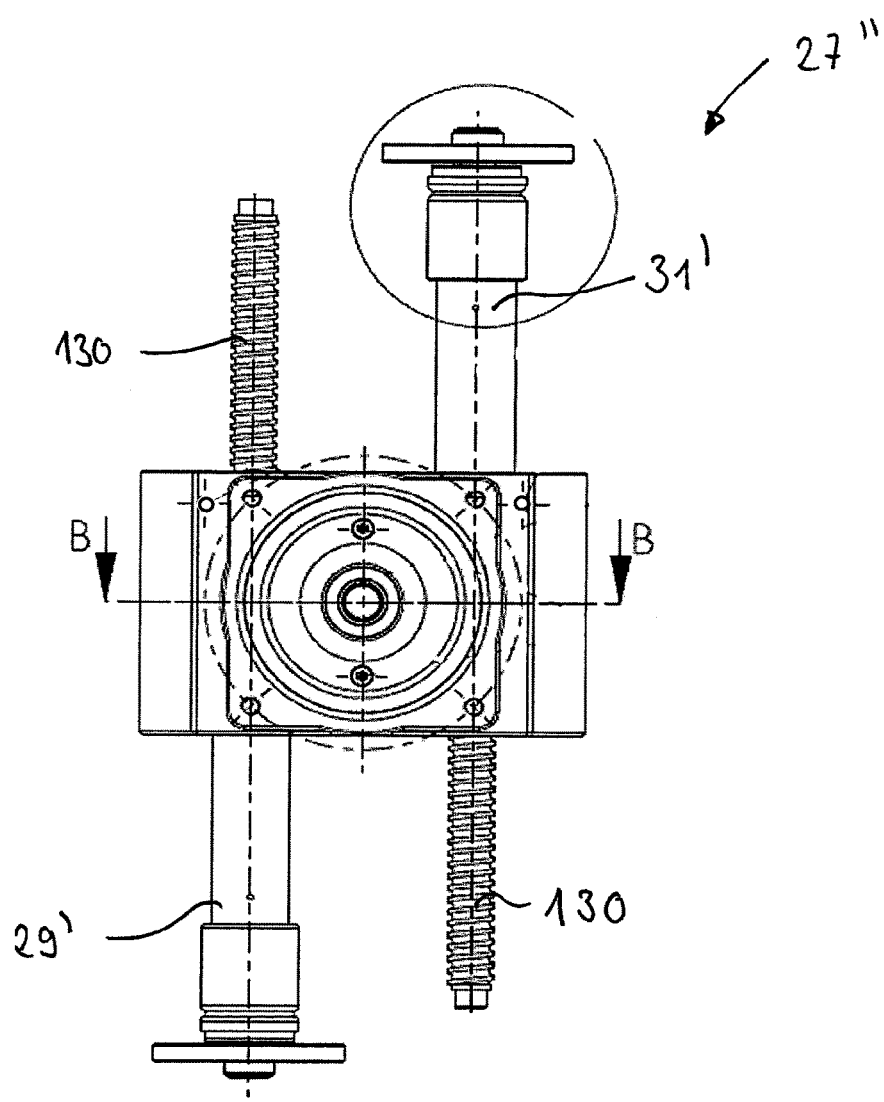
FIG. 4d is a transmission including the threaded rod of the exemplary embodiment of FIGS. 4a to 4c.
Figure 4E:
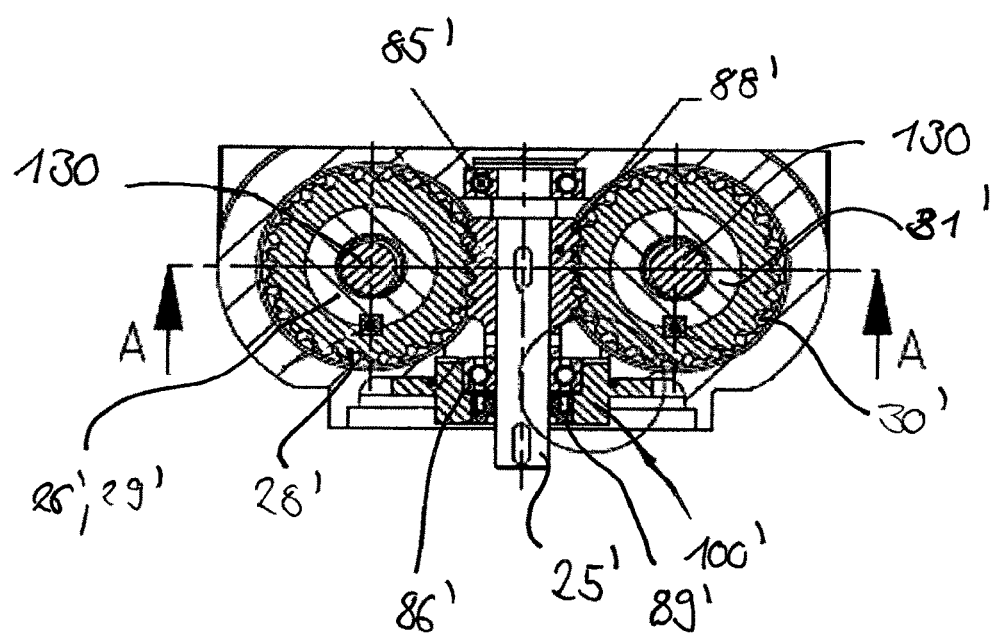
FIG. 4e is a schematic cross-sectional view through the transmission of FIG. 4d along the section line B-B.
Figure 4F:
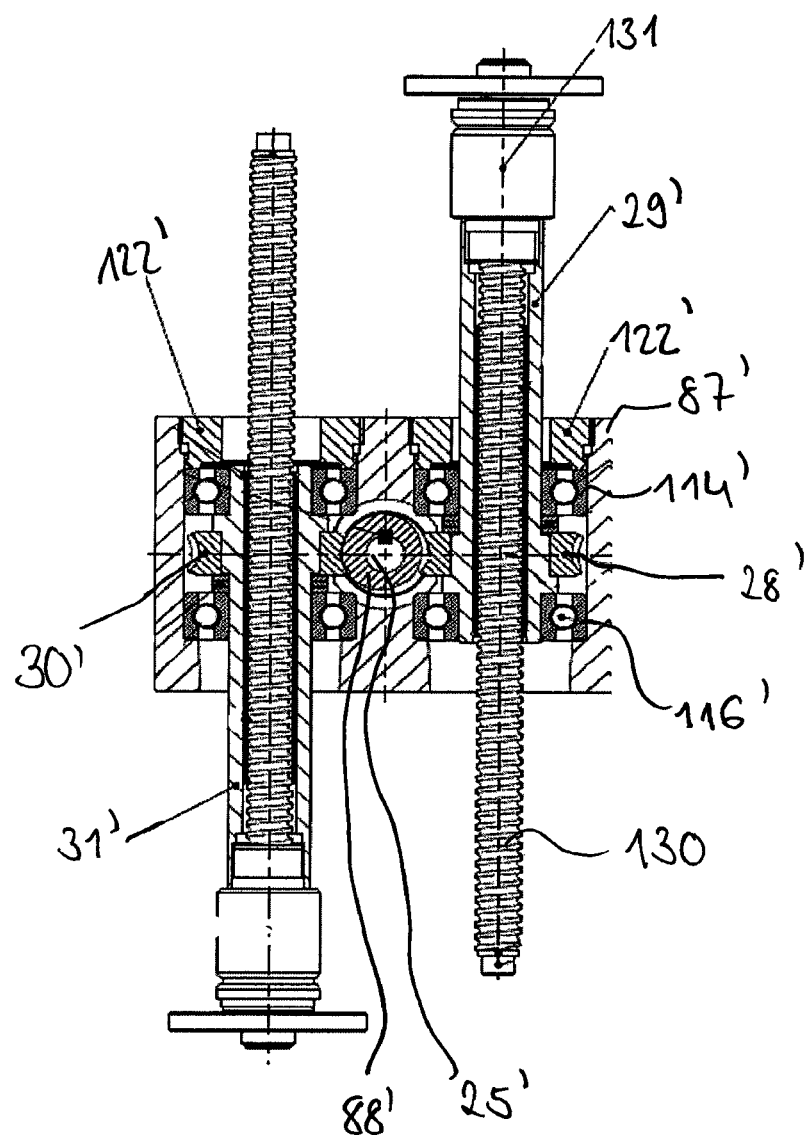
FIG. 4f is a schematic cross-sectional view through the transmission of FIG. 4e along the section line A-A.

FIGS. 4d and 4f show different configurations of a transmission 27" including the threaded rod 130 and the adapter piece 131. The transmission 27" is constructed substantially similar to the transmission 27. Identical or similar components are therefore indicated by identical reference numbers with the addition of a double prime (") symbol. Two transmissions 27" can also be used in the adjusting device 1 instead of the transmissions 27 and 27'.

Exemplary embodiments of the transmission or of the transmission housing produce low noise and vibration during operation such as when adjusting a platform for medical applications. As described in connection with the Figures, the transmission 27, a platform including the transmission 27, or the method 80 can be used in any possible medical applications, for example, for adjusting couches, beds, examination tables, or the like. The transmission 27 can be used, for example, in a lifting unit for a medical table. Such applications may include all possible applications or examinations, in particular X-ray applications or examinations, CT, CRT, MRT, and/or MRI examinations. In order to increase comfort for a patient and/or also for an operator, it is important in such applications to keep noise and vibration levels as low as reasonably possible. However, the transmission 27 and the method 80 can also be used other than as described for the exemplary embodiments of the figures, in all possible other applications and fields of use, such as, for example, in manufacturing, for assembly purposes, or the like.

The exemplary embodiments and their individual features disclosed in the above description, the following claims, and the accompanying Figures can be meaningful and implemented both individually and in any combination for the realization of an exemplary embodiment in its various designs.

In some further exemplary embodiments, features that are disclosed in other exemplary embodiments as device features can also be implemented as method features. Furthermore, features that are implemented in some exemplary embodiments as method features can also optionally be implemented in other exemplary embodiments as device features.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved transmissions for adjustable height platforms.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Adjusting device
3 Drive motor
5 Manual drive
7 First height-adjusting device
9 Second height-adjusting device
11 First guide structure
13 Second guide structure
15 Base plate
17 Platform plate
19 Tube greatest cross-section
21 Tube medium cross-section
23 Tube smallest cross-section
25 Drive shaft
25' Drive shaft
26 Output shaft
26' Output shaft
27 Transmission 27' Transmission
27" Transmission
28 First gear wheel
28' First gear wheel
29 Hollow shaft
30 Second gear wheel
30' Second gear wheel
31 Hollow shaft
31' Hollow shaft
33 Threaded rod
35 Threaded rod
80 Method
82 Process
84 Process
85 Rolling-element bearing
85' Rolling-element bearing
86 Rolling-element bearing
86' Rolling-element bearing
87 Transmission housing
87' Transmission housing
88 Worm gear
88' Worm gear
89 Seal ring
89' Seal ring
100 Transmission cover
100' Transmission cover
102 Stop
104 Spacer ring
106 Shoulder
108 Inner ring
110 Rolling-element bearing
112 Outer ring
114 Axial stop
114' Axial stop
116 Rolling-element bearing
116' Rolling-element bearing
118 Axial stop
120 Tongue-and-groove connection
122 Side part
122' Side part
130 Threaded rod
131 Adapter piece
133 Nut
135 Sleeve
137 Threads
139 Casing
141 Depression
143 Groove
R Drive-shaft axis of rotation

We claim:

1. A transmission for an adjustable-height platform comprising:
   a drive shaft;
   a first gear wheel, wherein the first gear wheel is configured to transmit a rotational movement of the drive shaft to a first output shaft, and
   a second gear wheel to transmit a rotational movement of the drive shaft to drive a hollow shaft in a rotational motion, the hollow shaft being a second output shaft,
   wherein the first gear wheel is made from a plastic material, coated with the plastic material, or comprises the plastic material, thus minimizing or avoiding vibration and noise during operation of the transmission,
   wherein a hollow portion of the hollow, second output shaft is in radial alignment with a thickness of the second gear wheel, enabling a threaded rod to pass through the hollow portion of the hollow second output shaft,
   wherein the arrangement enables a first end of the threaded rod to be located on a first axial side of the second gear wheel and wherein the arrangement enables a second, opposite end of the threaded rod to be located on a second, opposite axial side of the second gear wheel.

2. The transmission according to claim 1, wherein the first gear wheel is milled.

3. The transmission according to claim 1, wherein the drive shaft comprises steel.

4. The transmission according to claim 1, wherein the first gear wheel is a first worm gear wheel, the drive shaft further comprising a worm gear, wherein the worm gear is located on the drive shaft at least in a region where it engages with the first worm gear wheel.

5. The transmission according to claim 1, wherein the first gear wheel is removably mounted on the first output shaft.

6. The transmission according to claim 1, wherein the first output shaft is hollow and the first gear wheel is attached to an outer surface of the first output shaft.

7. The transmission according to a claim 6, further comprising:
   a threaded rod having an external thread, the threaded rod being at a least partially received in the first output shaft; and
   an adapter piece having an internal thread configured to engage or to form raceways with the external thread of the threaded rod,
   wherein the adapter piece includes an adapter attachment structure configured to connect the adapter piece to a corresponding hollow shaft attachment structure of the first output shaft so that the adapter piece and the first output shaft can rotate together.

8. An adjustable height platform comprising a transmission according to claim 1; and
   a platform plate,
   wherein the transmission is configured to change a position of the platform plate with respect to a surface supporting the adjustable height platform.

9. The transmission according to claim 1, further comprising:
   a threaded rod having an external thread, the threaded rod being at a least partially received in the hollow, second output shaft; and
   an adapter piece having an internal thread configured to engage or to form raceways with the external thread of the threaded rod,
   wherein the first gear wheel comprises a milled gear wheel,
   wherein the drive shaft comprises steel,
   wherein the first gear wheel is provided in a form of a worm gear wheel and the drive shaft includes a worm gear, wherein the worm gear is located on the drive shaft a region where the worm gear engages with the worm gear wheel,
   wherein the first gear wheel is removably mounted on the first output shaft,
   wherein the first output shaft is hollow and the first gear wheel is attached to an outer surface of the first output shaft, and
   wherein the adapter piece includes an adapter attachment structure configured to connect the adapter piece to a corresponding hollow-shaft attachment structure of the first output shaft so that the adapter piece and the first output shaft can rotate together.

10. The transmission according to claim 1, wherein the plastic is polyoxymethylene.

11. The transmission according to claim 10, the first gear wheel further comprising a metal gear wheel having exposed metal surfaces and having at least one functional surface coated with the plastic.

12. The transmission according to claim 1, the first gear wheel further comprising a metal gear wheel coated with the plastic.

13. The transmission according to claim 1, wherein the first gear wheel is formed entirely of the plastic.

14. A transmission for an adjustable-height platform comprising:
a drive shaft having a steel worm gear;
a first output shaft having a first worm gear wheel comprising plastic and engaged with the steel worm gear; and
a hollow second output shaft having a second worm gear wheel engaged with the steel worm gear,
wherein a hollow portion of the hollow second output shaft is in radial alignment with a thickness of the second worm gear wheel, enabling a threaded rod to pass through the hollow portion of the hollow second output shaft,
wherein the hollow portion of the hollow second output shaft and the second worm gear wheel are arranged enabling a first end of the threaded rod to be located on a first axial side of the second worm gear wheel and wherein the arrangement enables a second, opposite end of the threaded rod to be located on a second, opposite axial side of the second worm gear wheel,
wherein the first worm gear wheel is made from a plastic material, coated with the plastic material, or comprises the plastic material, thus minimizing or avoiding vibration and noise during operation of the transmission.

15. The transmission according to claim 14, wherein the first output shaft is hollow, the transmission further comprising a threaded rod having an external thread, the threaded rod being at least partially received in the first output shaft; and
an adapter piece having an internal thread mounted to an interior of the first output shaft in a manner where the adapter piece is rotationally fixed relative to the first output shaft.

16. The transmission according to claim 15, wherein the internal thread engages the external thread of the threaded rod.

17. The transmission according to claim 15, wherein the internal thread is radially spaced from the external thread and forms a raceway with the external thread.

18. A transmission for an adjustable-height platform comprising:
a drive shaft;
a first output shaft;
a first gear wheel, wherein each first gear wheel is configured to transmit a rotational movement of the drive shaft to the first output shaft, wherein the rotational movement of the first output shaft drives a first shaft assembly in a first direction respective to the transmission, and
a second gear wheel configured to transmit a rotational movement to a hollow, second output shaft, the hollow, second output shaft being a second output shaft, wherein the rotational movement of the respective hollow, second output shaft drives a second shaft assembly in a second direction respective to the transmission,
wherein the first direction and the second direction are opposite one another,
wherein a hollow portion of the hollow, second output shaft is in radial alignment with a thickness of the second gear wheel, enabling a threaded rod to pass through the hollow portion,
wherein the arrangement enables a first end of the threaded rod to be located on a first axial side of the second gear wheel and wherein the arrangement enables a second, opposite end of the threaded rod to be located on a second, opposite axial side of the second gear wheel,
wherein the first gear wheel is made from a plastic material, coated with the plastic material, or comprises the plastic material, thus minimizing or avoiding vibration and noise during operation of the transmission.

* * * * *